US009313333B2

(12) United States Patent
Tidwell et al.

(10) Patent No.: US 9,313,333 B2
(45) Date of Patent: *Apr. 12, 2016

(54) VOICEMAIL SCREENING AND CALL RETRIEVAL

(71) Applicant: Microsoft Technology Licensing, LLC, Redmond, WA (US)

(72) Inventors: Paul D. Tidwell, Sammamish, WA (US); Dan A. Knudson, Zurich (CH); Jeremy T. Buch, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,277

(22) Filed: Oct. 22, 2013

(65) Prior Publication Data

US 2014/0044244 A1 Feb. 13, 2014

Related U.S. Application Data

(63) Continuation of application No. 11/416,021, filed on May 2, 2006, now Pat. No. 8,565,219.

(51) Int. Cl.
*H04M 1/253* (2006.01)
*H04M 3/533* (2006.01)
*H04M 1/663* (2006.01)
(Continued)

(52) U.S. Cl.
CPC ........ *H04M 3/53358* (2013.01); *H04M 1/6505* (2013.01); *H04M 1/663* (2013.01); *H04M 3/53333* (2013.01); *H04M 1/2535* (2013.01); *H04M 1/65* (2013.01); *H04M 7/006* (2013.01); *H04M 2203/4563* (2013.01)

(58) Field of Classification Search
CPC ... H04M 1/2535; H04M 1/65; H04M 1/6505; H04M 1/663; H04M 2203/4563; H04M 3/53333; H04M 3/53358; H04M 7/006
USPC .................... 370/352–356; 379/93.23, 88.22, 379/210.02, 211.02; 455/413
See application file for complete search history.

(56) References Cited

U.S. PATENT DOCUMENTS 5,757,899 A  5/1998  Boulware et al.
6,978,004 B1  12/2005  Levine
(Continued)

OTHER PUBLICATIONS

U.S. Appl. No. 11/416,021, Office Action mailed May 27, 2010, 15 pgs.
(Continued)

*Primary Examiner* — Khaled Kassim
(74) *Attorney, Agent, or Firm* — Danielle Johnston Holmes; Micky Minhas

(57) ABSTRACT

Handling an incoming call from a caller to a user includes prompting a caller to record a message to the user and sending a special command to a user communication device indicting that the incoming call is available for screening and retrieving. In response to the user indicating a desire to screen the incoming call, the user listens to the message while the caller is leaving the message. In response to the user indicating a desire to retrieve the incoming call, the call is transferred to the user communication device. In response to the user indicating a desire to screen the call, an incoming media stream from the incoming call may be forked so that the message is being recorded while the user is listening to the message at the user communication device.

20 Claims, 5 Drawing Sheets

(51) Int. Cl.
  *H04M 1/65* (2006.01)
  *H04M 7/00* (2006.01)

(56) References Cited

U.S. PATENT DOCUMENTS

| | | |
|---|---|---|
| 8,565,219 B2 | 10/2013 | Tidwell et al. |
| 2002/0110224 A1* | 8/2002 | Kovales et al. ............. 379/67.1 |
| 2003/0026402 A1 | 2/2003 | Clapper |
| 2004/0062367 A1 | 4/2004 | Fellenstein et al. |
| 2005/0123118 A1 | 6/2005 | Terry et al. |
| 2005/0201534 A1 | 9/2005 | Ignatin |
| 2006/0227948 A1 | 10/2006 | Pearson et al. |

OTHER PUBLICATIONS

U.S. Appl. No. 11/416,021, Amendment and Response filed Sep. 27, 2010, 9 pgs.
U.S. Appl. No. 11/416,021, Office Action mailed Oct. 18, 2010, 17 pgs.
U.S. Appl. No. 11/416,021, Amendment and Response filed Dec. 20, 2010 11 pgs.
U.S. Appl. No. 11/416,021, Office Action mailed Feb. 23, 2011, 16 pgs.
U.S. Appl. No. 11/416,021, Amendment and Response filed Jun. 24, 2011, 11 pgs.
U.S. Appl. No. 11/416,021, Office Action mailed Sep. 7, 2011, 15 pgs.
U.S. Appl. No. 11/416,021, Amendment and Response filed Jan. 9, 2012, 11 pgs.
U.S. Appl. No. 11/416,021, Office Action mailed Mar. 27, 2012, 15 pgs.
U.S. Appl. No. 11/416,021, Amendment and Response filed Aug. 14, 2012, 11 pgs.
U.S. Appl. No. 11/416,021, Office Action mailed Nov. 28, 2012, 14 pgs.
U.S. Appl. No. 11/416,021, Amendment and Response filed Mar. 28, 2013, 9 pgs.
U.S. Appl. No. 11/416,021, Notice of Allowance mailed Jun. 19, 2013, 6 pgs.
U.S. Appl. No. 11/416,021, Amendment after Allowance filed Jul. 16, 2013, 6 pgs.
U.S. Appl. No. 11/416,021, Examiner's Response to Amendment after Allowance mailed Aug. 14, 2013, 1 page.
U.S. Appl. No. 11/416,021, Examiner's Response to Amendment after Allowance mailed Aug. 21, 2013, 2 pgs.

* cited by examiner

US 9,313,333 B2

VOICEMAIL SCREENING AND CALL RETRIEVAL

CROSS-REFERENCE TO RELATED APPLICATIONS

This application is a continuation of, and priority is hereby claimed to, U.S. patent application Ser. No. 11/416,021, now U.S. Pat. No. 8,565,219, filed May 2, 2006., entitled "VOICEMAIL SCREENING AND CALL RETRIEVAL," which application is hereby incorporated by reference.

BACKGROUND

A conventional standalone home voicemail system allows a user to screen incoming calls by listening as the caller is leaving the message and then, if desired, pick up the telephone while the caller is leaving the message to speak directly with the caller. PBX systems, including newer voice over IP systems, may use a centralized voicemail processing system for recording messages from incoming callers. Thus, it may be difficult to listen to a message being left by a caller while the caller is leaving the message. In addition, it may also be difficult to transfer a call to a user after the call has been initially transferred to the voicemail processing system.

It is desirable to provide a system that allows a user of a PBX system to listen to an incoming call while a caller is leaving a voice mail message and allows a user to pick up the call and speak directly to the caller after the caller has started to leave a message.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The system described herein handles an incoming call from a caller to a user by prompting a caller to record a message to the user and sending a special command to a user communication device indicting that the incoming call is available for screening and retrieving. In response to the user indicating a desire to screen the incoming call, the user listens to the message while the caller is leaving the message. In response to the user indicating a desire to retrieve the incoming call, the call is transferred to the user communication device. The user communication device may be a voice over IP telephone. A first dialog box may be presented to the user to indicate that the presence of the incoming call. In response to the user indicating a desire to screen the call, an incoming media stream from the incoming call may be forked so that the message is being recorded while the user is listening to the message at the user communication device.

The system described herein handles an incoming call from a caller to a user by determining is a user communication device is accepting incoming calls and, if so, routing the incoming call to the user communication device. If the user communication device is not accepting incoming calls, routing the incoming call to a voicemail processing system that prompts a caller to record a message to the user. The system described herein may send a special command to the user communication device indicting that the incoming call is available for screening and retrieving. In response to the user indicating a desire to screen the incoming call, a command is sent to the voicemail processing system causing a media stream from the incoming call to fork to both the voicemail processing system and the user communication device. In response to the user indicating a desire to retrieve the incoming call, a command is sent to the voicemail processing system causing the incoming call to be transferred to the user communication device.

The system described herein marks a message left by a caller by indicating that the message was screened if the message was screened by a user and by indicating that the message was retrieved if the message was retrieved by a user. An introduction may be appended to the message indicating that the message is marked.

DETAILED DESCRIPTION

Described herein are various technologies and techniques for voicemail screening and call retrieval. Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Figure 1:
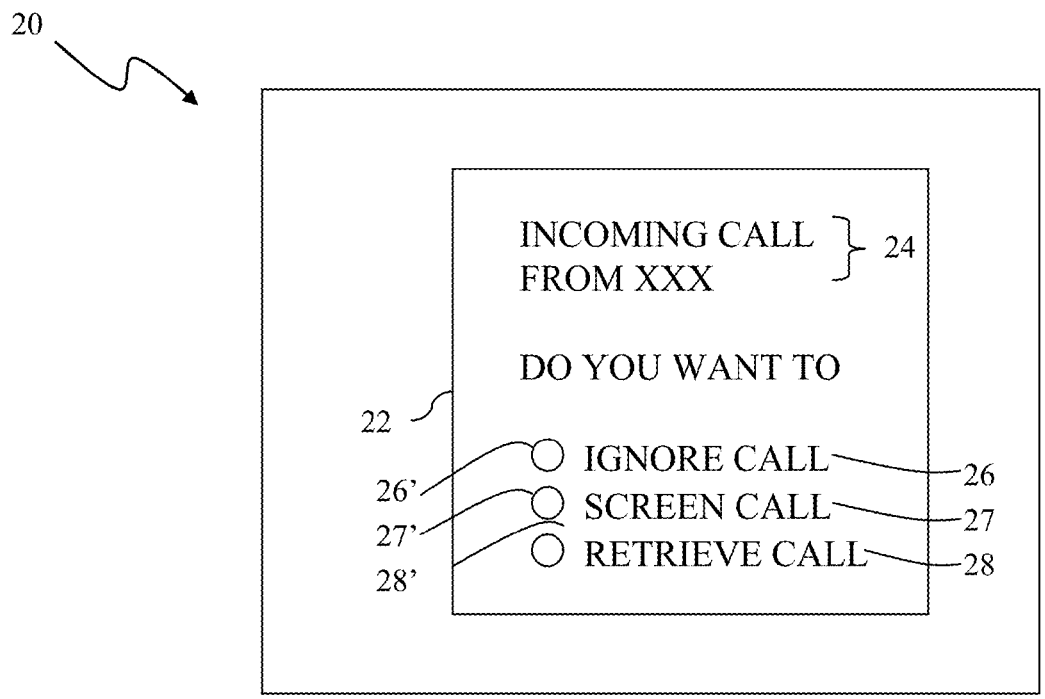
FIG. 1 is a diagram illustrating a first dialog box used in connection with the system described herein.

Referring to FIG. 1, a display screen 20 may be provided as part of a voice over IP (VOIP) telephone, as part of a computer system used in connection with a user communication device, such as a voice over IP telephone, a separate display screen that receives data for a user communication device, or is otherwise somehow associated with a user communication device to exchange data with a system that controls the user communication device as described elsewhere herein. The system described herein does not depend upon any specific implementation used to provide the functionality for the screen 20 and does not depend upon any specific type of user communication device being used.

The screen 20 is shown as having a dialog box 22, which may be a conventional dialog box, for presenting information to the user of the voice over IP telephone associated with the screen 20. In an embodiment herein, the dialog box 22 may be provided when the user of a voice over IP telephone receives an incoming telephone call while the user is already handling a call in progress. In other words, the dialog box 22 is presented to the user when the user is handling a first call and, at the same time, a subsequent call comes in for the user. The dialog box 22 may also be presented when the user does not answer an incoming call either inadvertently or when a user is actively screening calls.

In an embodiment herein, the user's VOIP telephone handles processing associated with the dialog box 22 and any other dialog boxes provided on the screen 20 and related processing. In some embodiments, the dialog box 22 is only provided when a user receives a subsequent incoming call while handling a current call. In other embodiments, the user may select when an incoming call causes the dialog box 22 to be presented so that, for example, the dialog box 22 may be provided at times other than when a user receives a subsequent incoming call while handling a current call. The dialog box 22 may also be presented when a user does not answer an incoming call after a certain number of rings. Of course, a mechanism other than a dialog box may be used to present information and receive user input.

The dialog box 22 includes an informational section 24 that informs the user that an incoming call is being processed and, optionally, indicates to the user the source of the incoming call. Information about the source of the incoming call may be received using conventional means, such as conventional caller ID technology. Thus, when the dialog box 22 is presented to the user, the user learns that there is an incoming call and, if the informational section indicates a source of the call, the user also learns who is calling. In an embodiment herein, the dialog box 22 is presented to the user when the incoming call is sent to a voicemail system to provide the caller with options for leaving a voice message for the user. The interaction of the voicemail system with the presentation of the dialog box 22 is discussed in more detail elsewhere herein.

The dialog box 22 also presents the user with a plurality of options 26-28. The option 26 allows the user to maintain the incoming call in the voice of system by ignoring the incoming call. As discussed elsewhere herein, the dialog box is presented 22 to the user when an incoming call is sent to a voicemail processing system. The user may decide to maintain the incoming call in the voicemail system. If so, then the user uses an appropriate input device, such as a mouse, to actuate a conventional control button 26'. Of course, any other appropriate mechanism may be used to select the option 26. In an embodiment herein, once the user selects the option 26 to maintain the incoming call in the voicemail processing system, the dialog box 22 is closed. However, in other embodiments, it may be possible to maintain the dialog box 22 even after the user has selected the option 26.

The user may decide to screen the incoming call in a manner similar to screening a call on a stand-alone home a voice messaging system. That is, the user may decide to listen to the caller's message while it is being recorded by the caller at the voicemail processing system. If the user decides to screen the incoming call, then the user may select the option 27 by appropriately actuating a control 27' for the screening an incoming call. In an embodiment herein, the media channel being screened is half duplex so that the user can hear the caller but the caller does not hear any sound at the user's end. Screening an incoming call is discussed in more detail elsewhere herein.

The user may decide to retrieve the incoming call, which means the user has decided to take the incoming call and forego, in some fashion, the current call that the user is handling. For example, the user may hang up on the current call prior to retrieving the incoming call. As another example, the user may place the current call on hold prior to retrieving the incoming call. Retrieving an incoming call is similar to a user of a home standalone voice messaging system picking up the telephone receiver and speaking to the caller while the home standalone voice messaging system is recording an incoming call. However, in an embodiment herein, when a user retrieves an incoming call, the call is handed off from the voicemail processing system and thus is no longer being handled by the voicemail processing system. If the user decides to retrieve the incoming call, the user actuates a control 28' associated with the option 28 for retrieving an incoming call. Retrieving an incoming call is discussed in more detail elsewhere herein.

Figure 2:
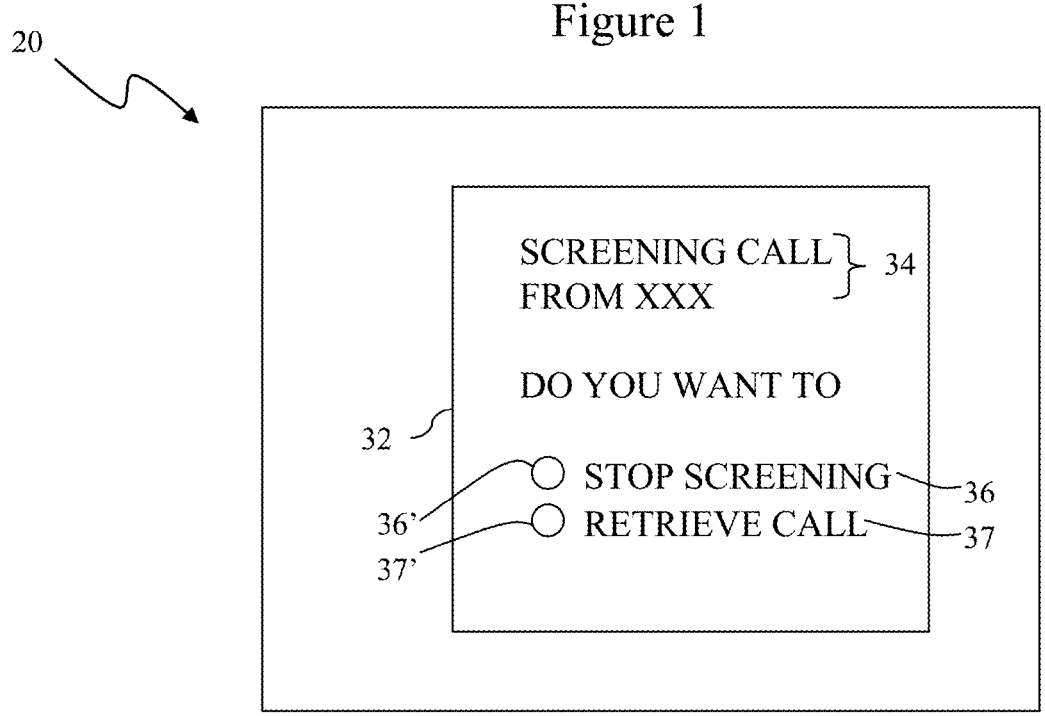
FIG. 2 is diagram illustrating a second dialog box used in connection with the system described herein.

Referring to FIG. 2, the screen 20 is shown with a second dialog box 32 that is presented to the user in response to the user selecting the option 27 in the first dialog box 22 for screening the call. As discussed elsewhere herein, the user may screen an incoming call while the incoming call is simultaneously being handled by the voicemail processing system. The incoming call that is being screened is simultaneously being handled by the voicemail processing system and being listened to by the user. In an embodiment herein, the media channel being screened is half duplex so that the user can hear the caller but the caller does not hear any sound at the user's end.

The second dialog box 32 includes an informational section 34 that informs the user that the call is being screened and optionally indicates the source of the incoming call in a manner similar to indicating the source of the call in connection with the dialog box 22. In addition, the user is provided with two options, a first option 36 to stop screening the call and a second option 37 to retrieve the call. The user may choose the first option 36 to stop screening the call by actuating a control 36'. In an embodiment herein, if the user selects the action 36 to stop screening the call, the dialog box 32 is closed and the incoming call continues to be handled by the voicemail processing system in a conventional manner.

Alternatively, the user may select the option 37 by actuating a control 37' to retrieve the incoming call that is being screened. If the user chooses to retrieve the call, the incoming call is transferred from the voicemail processing system to the user's telephone and, in an embodiment herein, the dialog box 32 is closed.

Figure 3:
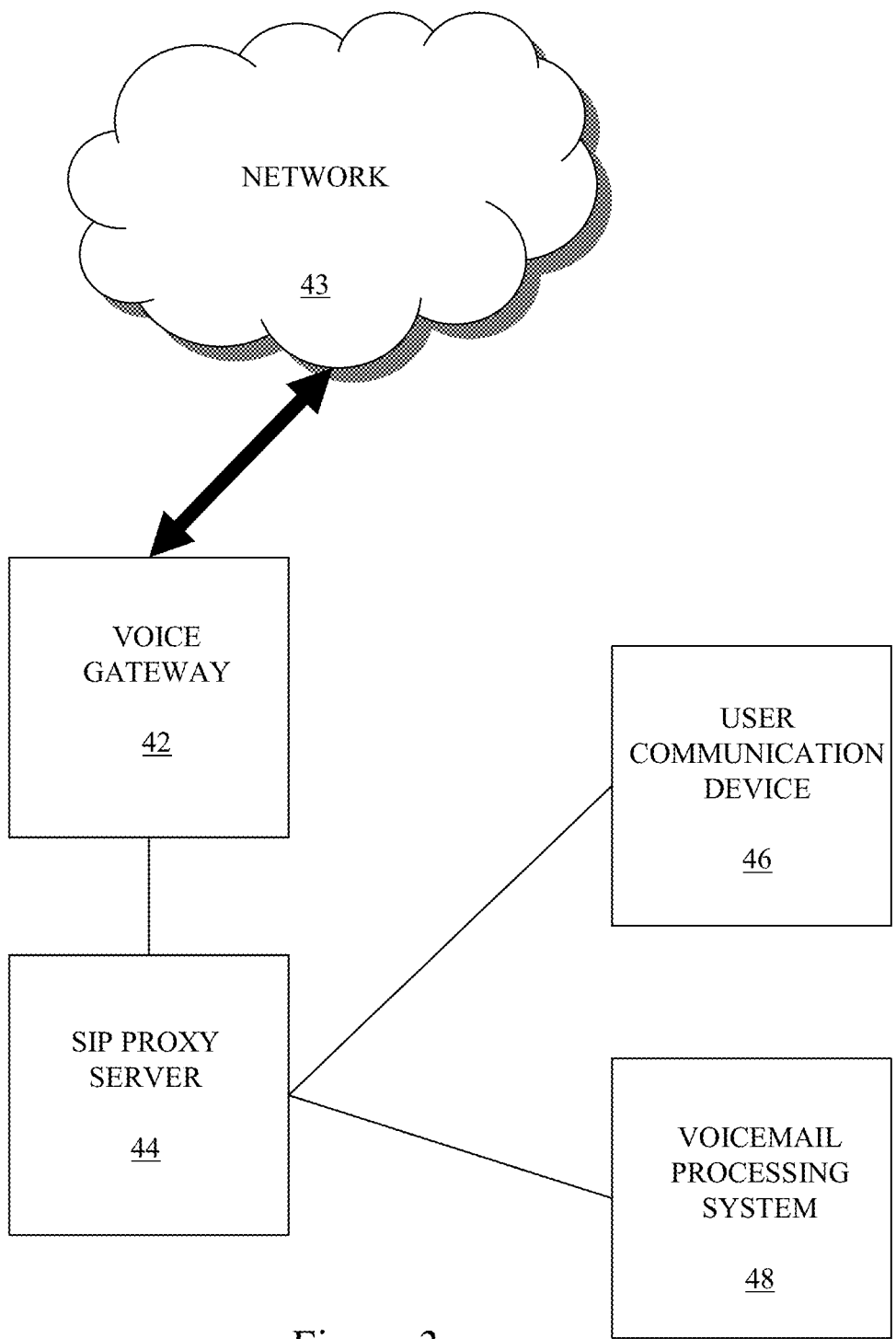
FIG. 3 is a diagram illustrating a network, a voice gateway, a SIP proxy server, a user communication device, in a voice no processing according to the system described herein.

Referring to FIG. 3, a telephone system 40 illustrates components that may be used to implement the system described herein. A voice gateway 42 is coupled to a network 43 used for transmitting and receiving calls. All calls may be transmitted through the network 43 and thus through the voice gateway 42. In the case of a voice over IP telephone system, the network 43 may be the Internet. The voice gateway 42 may be implemented using conventional processor technology programmed in an appropriate fashion. There are many commercially available voice gateway systems that are capable of providing the functionality described herein and/or may be adapted in a straight-forward manner in accordance with the description herein.

The voice gateway 42 may be coupled to a SIP proxy server 44 that may be used to route calls and establish paths between incoming and outgoing calls and any of a plurality of user communication devices, one or more voicemail processing systems, and/or any other devices that are used in connection with the telephone system 40. Just as with the voice gateway 42, the SIP proxy server 44 may be implemented using commercially available components, including one or more processors, and/or may be implemented by adapting commercially available components in a straight-forward manner in accordance with the description herein. The SIP proxy server 44 may contain software that is programmed to provide the functionality described herein. In some embodiments, the voice gateway 42 and the SIP proxy server 44 may be integrated into a single unit.

The SIP proxy server 44 is coupled to a user communication device 46, such as a voice over IP telephone, which may include a display like the display 20 discussed above. Just as with the voice gateway 42 and the SIP proxy server 44, the user communication device 46 (and possible integrated or separate display) may be provided using commercially available components, including one or more processors, and/or may be implemented by adapting commercially available components in a straight-forward manner in accordance with the description herein. The user communication device 46 may contain software that is programmed to provide the functionality described herein. As discussed elsewhere herein, the user communication device 46 may have an integrated display or the display may be provided separately from the user communication device 46 and/or at the display may be provided on a user's computer system. There are a number of appropriate configurations for the display consistent with the description herein. In an embodiment herein, the user communication device 46 is a voice over IP telephone.

The SIP proxy server 44 is also coupled to a voicemail processing system 48. Just as with the voice gateway 42, the SIP proxy server 44, and the user communication device 46, the voicemail processing system 48 may be implemented using commercially available components, including one or more processors, and/or may be implemented by adapting commercially available components in a straight-forward manner in accordance with the description herein. The voicemail processing system 48 may contain software that is programmed to provide the functionality described herein. Some or all of the voice gateway 42, the SIP proxy server 44, and the voicemail processing system 48 may be implemented in a single unit or any number of separate units.

The voice gateway 42 receives incoming calls and directs outgoing calls. Incoming calls received by the voice gateway 42 may be provided to the SIP proxy server 44 which directs the calls to the appropriate component (e.g., the user communication device 46). In some embodiments, the voice gateway 42 may also direct calls to components besides the SIP proxy server 44 while in other embodiments the voice gateway 42 does not direct calls to any component other than the SIP proxy server 44.

Figure 4:
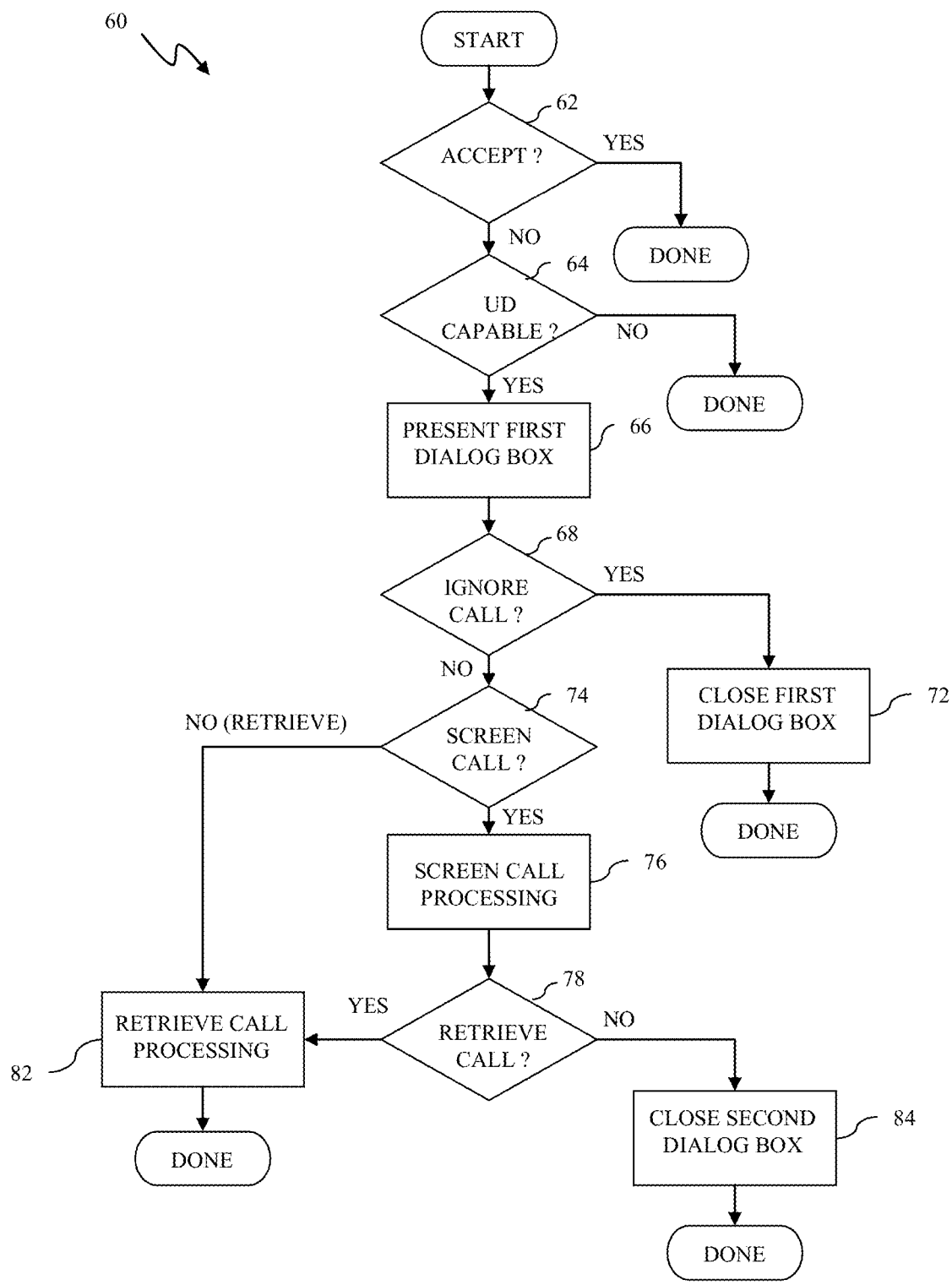
FIG. 4 is a flow chart illustrating screening and retrieving incoming calls according to the system described herein.

Referring to FIG. 4, a flow chart 60 illustrates steps performed in connection with managing incoming calls. The processing illustrated by the flow chart 60 may be performed by the SIP proxy server 44, the Gateway 42, the user communication device 46, other devices, and/or any device or combination of devices that may provide the functionality described herein. Thus, the system described herein does not depend upon the particular device or combination of devices performing the processing illustrated by the flow chart 60.

Processing begins at a first test step 62 where it is determined if the user communication device 46 is accepting calls. In an embodiment herein, the user communication device is accepting calls if the user is not handling a current call when the incoming call occurs. However, as discussed elsewhere herein, other criteria may be used, including user-settable parameters actuated by the user. For example, the user may decide to handle all incoming calls using the system described herein and thus not otherwise accept any incoming calls when the calls first arrive. In addition, it is possible that a user may be available on more than one device, in which case the inquiry may be sent to all possible devices, or a subset thereof, on which a user may be available. Accordingly, for the discussion herein, it should be understood that, where appropriate, reference to the user communication device 46 includes any other device on which the user is available to handle incoming calls.

The test at the step 62 may be performed by either the SIP proxy server 44 or the voice gateway 42 sending a message to the user communication device 46 to inquire if the user communication device 46 is already handling a call (or is configured to handle incoming calls a certain way) and by the user communication device 46 returning an appropriate status message. The specific messages sent and received at the step 62 (and at other steps of the system described herein) depend upon implementation details for the system described herein. In an embodiment herein, conventional commands and responses for systems like those described herein may be used to exchange commands/inquiries at the step 62.

If it is determined that the user communication device is accepting calls, then processing is complete. Note that, in this case (and in other cases where processing according to the flow chart 60 is complete), processing being complete may simply mean that incoming call will be handled in a manner consistent with whatever system is implemented for handling incoming calls for users aside from the system described herein. In other words, the processing illustrated by the flow chart 60 is in addition to whatever processing is otherwise performed by the telephone system as described herein.

If it is determined at the test step 62 that the user communication device 46 is not accepting calls (for example, because the user is already handling a telephone call), then control transfers from the test step 62 to a test step 64 where it is determined if the user device is compatible with the functionality described herein. Note that the system described herein may not be provided to a user that does not have the appropriate hardware and/or other components necessary to provide the functionality described herein. For example, if the user does not have a display for use in connection with the user communication device, then the first dialog box 22 and the second dialog box 32 can not be presented to the user and thus the user does not have compatible components. Other tests may be used at the step 64 to determine if the system can handle any special commands/inquiries used to implement the system described herein.

In an embodiment herein, an incoming call may be handled by the voicemail processing system 48, which sends a special command code to the user communication device 46 (and possibly other components) indicating that an incoming call is available for handling in accordance with the system described herein. If the user communication device 46 (and possibly other components) do not recognize the special command code or do recognize the special command code but are not capable of providing the functionality described herein for whatever reason (e.g., no display), then the result of the test at the step 64 is that the user device is not compatible. If it is determined at the test step 64 that the user device (and/or other components) are not compatible with providing the functionality described herein, then processing is complete.

In other embodiments, a table may be used for the test at the step 64 of the flowchart 60 of FIG. 4 to determine if the components used to provide the system described herein are compatible. The table may contain a list of which devices are compatible so the test at the step 64 looks up the user's particular device (i.e., the user's particular user communication device) in the table to determine compatibility. If the device is not in the table, then the result of the test at the step 64 is that the user's device is not compatible.

If it is determined at the test step 64 that the relevant components are compatible with providing the functionality described herein, then control transfers from the test step 64 to a step 66 where the first dialog box 22 is provided to the display associated with the user communication device 46. Presenting the dialog box at the step 66 may be by any appropriate means. In an embodiment herein, the user communication device 46 may present the first dialog box 22 in response to receiving the special code at the test step 64.

Following the step 66 is a test step 68 which determines if the user has selected the option 26 for ignoring the incoming call. If so, then control transfers from the test step 68 to a step 72 were the first dialog box, presented at the step 66, is closed. The processing performed by the steps 68, 72 may be performed by the user communication device 46. In some embodiments, the user communication device 46 may also send a message indicating a desire to ignore the incoming call to the voicemail processing system 48 in connection with closing the dialog box at the step 72. Following step 72, processing is complete.

If it is determined at the test step 68 that the user has not selected the option 26 to ignore the incoming call, then control transfers from the test step 68 to a test step 74 where it is determined if the user has selected the option 27 to screen the incoming call or the option 28 to retrieve the incoming call. The processing illustrated by the steps 68, 74 assumes that the user will have selected one of the three options 26-28 presented in the dialog box 22. In an embodiment herein, no additional processing is performed unless and until the user selects one of the options 26-28. Of course, it is possible to provide additional processing that causes the user to timeout if too much time has elapsed since presenting the first dialog box 22 at the steps 66. In an embodiment herein, the timeout may be treated just like the user selecting the option 26 to ignore incoming call and thus, in response to a timeout condition, the step 72 (or a step like the step 72) is executed to close the first dialog box 22, following which processing is complete.

If it is determined at the test step 74 that the user has decided to screen the incoming call, then control transfers from the test step 74 to a step 76 where call screening processing is performed. The call screening processing performed at the step 76 is discussed in more detail elsewhere herein. Following the step 76 is a test step 78 where it is determined if, during the call screening processing illustrated by the step 76, the user has chosen to retrieve the incoming call. If so, then control transfers from the test step 78 to a step 82 where call retrieve processing is performed. Performing the call retrieve processing at the step 82 is discussed in more detail elsewhere herein. Note that the step 82 may also be reached if it is determined at the test step 74 that the user has selected to retrieve the incoming call in connection with the first dialog box 22 (i.e., the user has selected the option 28). Following the step 82, processing is complete.

If it is determined at the test step 78 that the user has not selected the option 37 to retrieve the incoming call (and therefore the user has selected the option 36 to stop screening the incoming call), then control transfers from the test step 78 to a step 84 were the second dialog box is closed. Following the step 84, processing is complete.

In an embodiment herein, the incoming call may end (e.g., because the caller has hung up) either while the first dialog box 22 is being presented to the user or while the second dialog box 32 is being presented to the user. In those cases, the call ending may be treated like the user selecting the option 26 to ignore the incoming call at the first dialog box 22 or selecting the option 36 to stop screening the incoming call at the second dialog box 32. In any event, once the incoming call has ended, it is not possible to either screen the call or retrieve the call.

Figure 5:
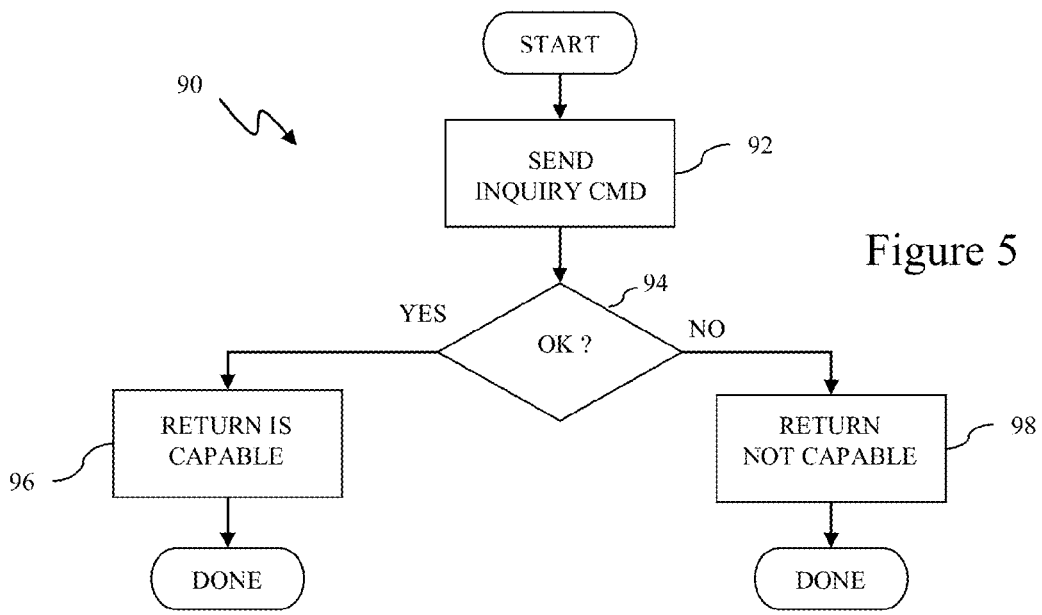
FIG. 5 is a flow chart illustrating determining if a user communication device is capable of screening and retrieving incoming calls according to the system described herein.

Referring to FIG. 5, a flow chart 90 illustrates steps performed in connection with an embodiment where the user communication device 46 is tested to determine if it is compatible with the system described herein. Processing begins at a first step 92 where a message is sent to the user communication device 46. In an embodiment herein, the message is sent by the voicemail processing system 48, although it is possible for the message to be sent by any appropriate component. Following the step 92 is a test step 94 which determines if an appropriate response has been received. If so, then control transfers from the test step 94 to a step 96 where the processing that determines compatibility returns an indication that the tested device is compatible with the system described herein. Following the step 96, processing is complete.

If it is determined at the test step 94 that an appropriate response has not been received, then control transfers from the test step 94 to a step 98 where an indication of incompatibility is returned. Note that an inappropriate response could include no response at all or a response indicating that the user communication device 46 does not support the functionality described herein. Following the step 98, processing is complete.

Figure 6:
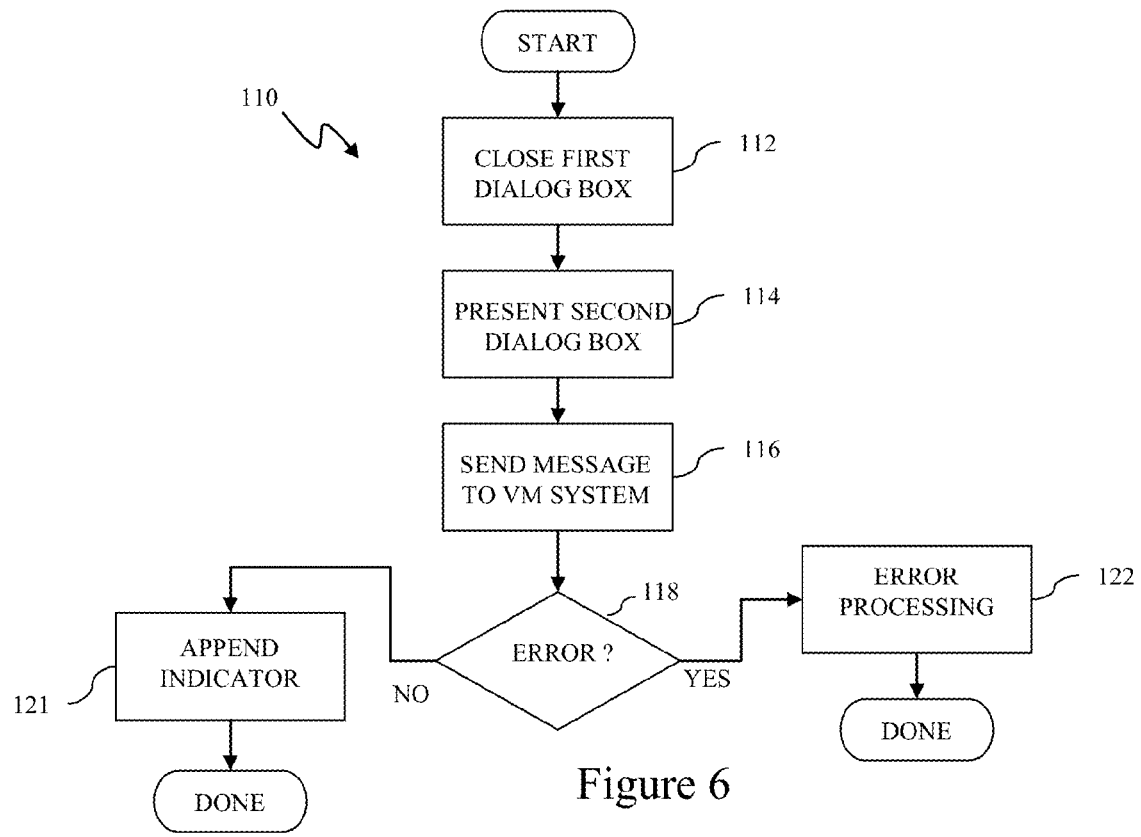
FIG. 6 is a flow chart illustrating screening incoming calls according to the system described herein.

Referring to FIG. 6, a flowchart 110 illustrates steps performed in connection with the call screening processing described above in connection with the step 76 of the flowchart 60 of FIG. 4. Processing begins at a first step 112 wherein the first dialog box 22 is closed. In an embodiment herein, the first dialog box 22 is closed by the user communication device 46, although any other appropriate component may be used to close the first dialog box 22. Following the step 112 is a step 114 where the second dialog box is presented to the user. Just as with the first dialog box 22, in an embodiment herein, the second dialog box 32 may be provided by the user communication device 46, although any other appropriate component may be used to provide the second dialog box 32.

Following the step 114 is a step 116 where a notification is sent to the voicemail processing system 48 to cause the voicemail processing system 48 to fork the media streaming in from the incoming call back to the user communication device 46 (or whatever appropriate device the user is using to listen screened calls). The specific message sent at the step 116 depends upon implementation details for the system described herein. In an embodiment herein, conventional voicemail system commands (defined by RFC 3261) are enhanced to provide additional commands that provide the functionality described herein. Accordingly, the message sent to the voicemail processing system 48 at the step 116 may be a modified "200 OK" command (or the equivalent) causing the voicemail processing system 48 to fork the media coming into the voicemail processing system 48 to provide a media stream from the incoming call to the user communication device 46 of the user (or whatever device the user is listening to screen calls). In another embodiment, it is possible to use a conventional "200 OK" command because the voicemail processing system 48 already knows that the media is to be forked based on the context.

Following the step 116 is a test step 118 where it is determined if an error has occurred in connection with sending the command to the voicemail processing system 48 at the step 116. If not, then control transfers from the step 118 to a step 121 to mark the message left using the voicemail processing system 48 to indicate that the message had been screened using the system described herein. Marking the message may be by any appropriate means, including sending a command to the voicemail processing system 48 to cause the voicemail processing system 48 to append a special introduction to the audio stream corresponding to the voicemail message. In systems where voicemail messages are forwarded using an email system, the email message may be made to contain an indicator that the corresponding voicemail message had been screened. Following the step 121, processing is complete.

If it is determined at the step 118 that an error has occurred, then control transfers from the test step 118 to a step 122 to perform error processing. Detection of errors at the step 118 as well as the particular error processing performed at the step 122, depends upon specific implementation details of the system. In an embodiment herein, after the command is sent to the voicemail processing system 48, the voicemail processing system 48 returns a result of processing that command to the calling device/routine. Thus, the test at the step 118 may simply determine if the return value from the voicemail processing system 48 indicates that an error has occurred. Similarly, the error processing performed at the step 122 is also an implementation specific detail that depends upon the implementation of the system described herein. In some embodiments, error processing may include reporting an error to the user at the step 122 while in other embodiments error processing performed the step 122 may include retrying the command a certain number of times, trying different commands that provide the same or similar result, etc. Following the step 122, processing is complete.

Figure 7:
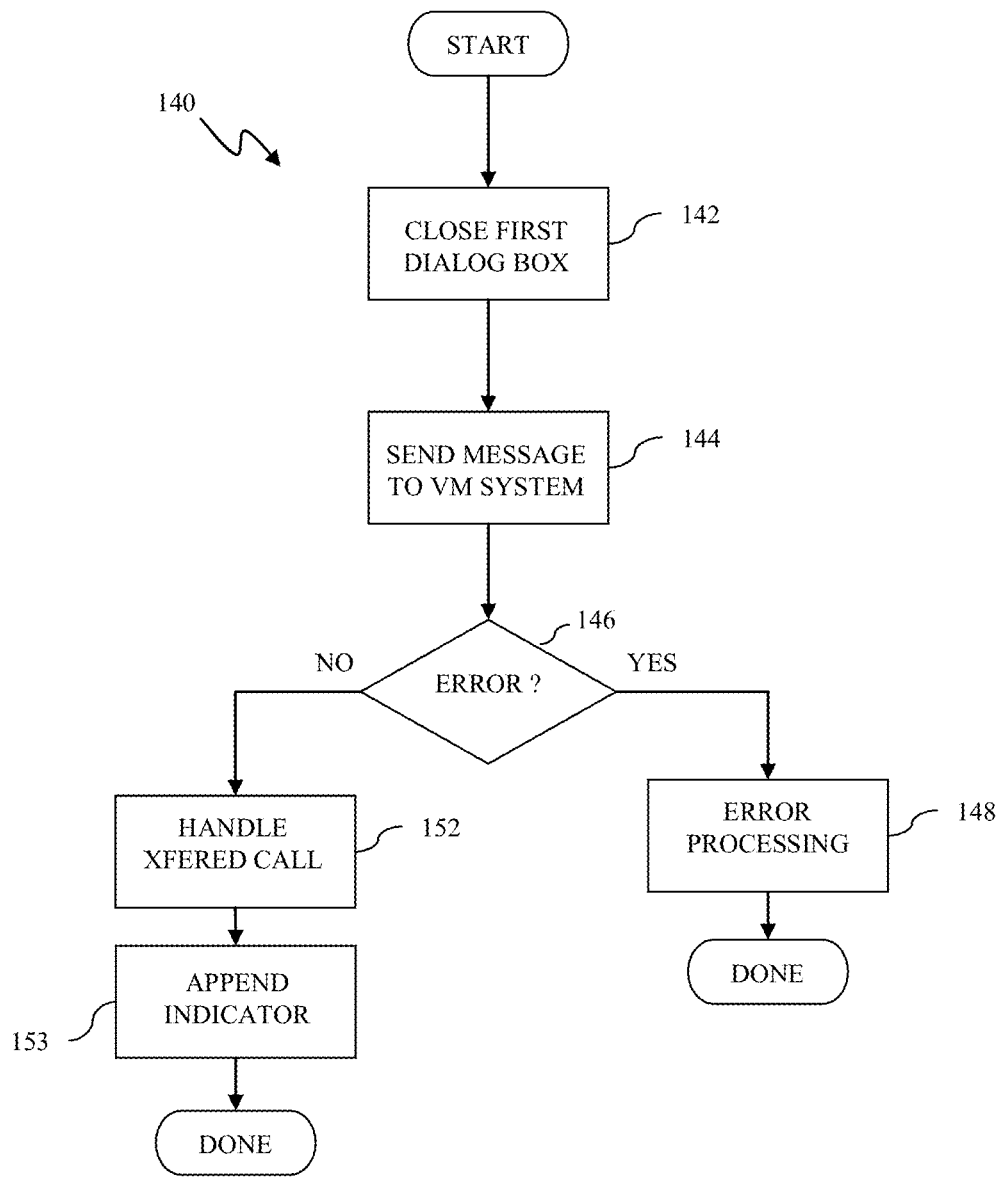
FIG. 7 is a flow chart illustrating retrieving incoming calls according to the system described herein.

Referring to FIG. 7, a flowchart 140 illustrates steps performed in connection with the call retrieval processing provided in the step 82 of the flowchart 60 of FIG. 4. Processing begins at a first step 142 were the first dialog box is closed (e.g., by the user communication device 46 or some other appropriate component). Following the step 142 is a step 144 where a transfer command is provided to the voicemail processing system 48. The transfer command provided at the step 144 causes the call being handled by the voicemail processing system 48 to be transferred to the user communication device 46. Thus, a conventional transfer command (e.g., per RFC 3515) may be used at the step 144. Of course, any other appropriate mechanism to cause the call transfer may also be used. In addition, a mechanism other than a call transfer may be used.

Following the step 144 is a test step 146 which determines if an error has occurred. The tests for an error at the step 146, as well as the nature and types of errors that may occur, depend upon the specific implementation of the system described herein. If it is determined at the test step 146 that an error has occurred, then control transfers from the test step 146 to step 148 where appropriate error processing is performed. Following the step 148, processing is complete.

If it is determined at the test step 146 that no error has occurred, then control transfers from the test step 146 to a step 152 where the transferred incoming call is handled by the user at the user communication device 46. Thus, an incoming call that may have been initially handled by the voice processing system 48 may be transferred over to the user communication device 46 (or similar device) so that the user may continue a live conversation with the caller who had just previously been leaving a voice message at the voicemail processing system 48. In some embodiments, the message left by the caller may be retained. In other embodiments, the voicemail processing system 48 may continue to record the live conversation between the caller and the user.

Following the step 152, is a step 153 where the message left using the voicemail processing system 48 (if any) is marked to indicate that the incoming call had been retrieved using the system described herein. Marking the message may be by any appropriate means, including sending a command to the voicemail processing system 48 to cause the voicemail processing system 48 to append a special introduction to the audio stream corresponding to the voicemail message. In systems where voicemail messages are forwarded using an email system, the email message may be made to contain an indicator that the corresponding voicemail message had been retrieved. Following the step 153, processing is complete.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of handling an incoming call from a caller to a user, comprising:
   determining whether a user communication device is accepting calls based on one or more user parameters;
   determining, based on the one or more user parameters, that the user communication device is not accepting calls;
   prompting a caller to record a voice mail message to the user;
   determining that the user communication device is capable of screening the incoming call based on a message received from the user communication device;
   sending a special command to the user communication device indicating that the incoming call is available for screening and retrieving, wherein, in response to the user indicating a desire to screen the incoming call, the user listens to the voice mail message while the caller is leaving the voice mail message; and
   receiving a command to mark the voice mail message as retrieved, wherein marking comprises appending an introduction to an audio stream corresponding to the voice mail message.

2. A method, according to claim 1, wherein the user communication device is a voice over IP telephone.

3. A method, according to claim 1, further comprising:
   causing a first dialog box to be presented to the user to indicate the presence of the incoming call.

4. A method, according to claim 3, wherein the user indicates a desire to screen the incoming call by actuating a control in the first dialog box.

5. A method, according to claim 4, wherein the user indicates a desire to retrieve the incoming call by actuating a control in a second dialog box that is presented to the user after the first dialog box is closed.

6. A method, according to claim 1, wherein, in response to the user indicating a desire to screen the call, an incoming media stream from the incoming call is forked so that the voice mail message is being recorded while the user is listening to the voice mail message at the user communication device.

7. A method, according to claim 1, wherein the introduction to the audio stream indicates that the voice message has been retrieved.

8. A system comprising
a processor;
a memory communicatively coupled to the processor, the memory having computer-executable instructions that when executed by the processor, provide a method of handling an incoming call from a caller to a user, the method comprising:
determining whether a user communication device is accepting calls based on one or more user parameters;
determining, based on the one or more user parameters, that the user communication device is not accepting calls;
prompting a caller to record a voice mail message to the user;
determining that the user communication device is capable of screening the incoming call based on a message received from the user communication device;
sending a special command to the user communication device indicating that the incoming call is available for screening and retrieving, wherein, in response to the user indicating a desire to screen the incoming call, the user listens to the voice mail message while the caller is leaving the voice mail message; and
receiving a command to mark the voice mail message as retrieved, wherein marking comprises appending an introduction to an audio stream corresponding to the voice mail message.

9. A system, according to claim 8, wherein the user communication device is a voice over IP telephone.

10. A system, according to claim 8, further comprising:
causing a first dialog box to be presented to the user to indicate the presence of the incoming call.

11. A system, according to claim 10, wherein the user indicates a desire to screen the incoming call by actuating a control in the first dialog box.

12. A system, according to claim 11, wherein the user indicates a desire to retrieve the incoming call by actuating a control in a second dialog box that is presented to the user after the first dialog box is closed.

13. A system, according to claim 8, wherein, in response to the user indicating a desire to screen the call, an incoming media stream from the incoming call is forked so that the voice mail message is being recorded while the user is listening to the voice mail message at the user communication device.

14. A system, according to claim 8, wherein the introduction to the audio stream indicates that the voice message has been retrieved.

15. A system comprising:
a voice over IP telephone; and
a computer memory, wherein the voice over IP telephone is communicatively coupled to the computer memory, and wherein the computer memory stores instructions that, when executed perform a method for handling an incoming call from a caller to a user, the method comprising:
determining whether the voice over IP telephone is accepting calls based on one or more user parameters;
determining, based on the one or more user parameters, that the voice over IP telephone is not accepting calls;
prompting a caller to record a voice mail message to the user;
determining that the voice over IP telephone is capable of screening the incoming call based on a message received from the voice over IP telephone;
sending a special command to the voice over IP telephone indicating that the incoming call is available for screening and retrieving, wherein, in response to the user indicating a desire to screen the incoming call, the user listens to the voice mail message while the caller is leaving the voice mail message; and
receiving a command to mark the voice mail message as retrieved, wherein marking comprises appending an introduction to an audio stream corresponding to the voice mail message.

16. The system of claim 15, further comprising:
causing a first dialog box to be presented to the user to indicate the presence of the incoming call.

17. The system of claim 16, wherein the user indicates a desire to screen the incoming call by actuating a control in the first dialog box.

18. The system of claim 17, wherein the user indicates a desire to retrieve the incoming call by actuating a control in a second dialog box that is presented to the user after the first dialog box is closed.

19. The system of claim 15, wherein, in response to the user indicating a desire to screen the call, an incoming media stream from the incoming call is forked so that the voice mail message is being recorded while the user is listening to the voice mail message at the voice over IP telephone.

20. The system of claim 15, wherein the introduction to the audio stream indicates that the voice message has been retrieved.

* * * * *